United States Patent [19]
Bleier

[11] Patent Number: 5,796,085
[45] Date of Patent: Aug. 18, 1998

[54] CHIP CARD READER

[75] Inventor: Robert Bleier, Bad Wimpfen, Germany

[73] Assignee: Amphenol-Tuchel Electronics GmbH, Heilbronn, Germany

[21] Appl. No.: 605,748

[22] Filed: Feb. 22, 1996

[30] Foreign Application Priority Data

Feb. 24, 1995 [DE] Germany .................. 195 06 606.5

[51] Int. Cl.$^6$ .................. G06K 7/06; G06K 19/00
[52] U.S. Cl. .................. 235/441; 235/486
[58] Field of Search .................. 235/486, 475, 235/479, 492, 441, 487; 439/188, 260; 361/740, 747, 759, 754

[56] References Cited

U.S. PATENT DOCUMENTS

| | | | |
|---|---|---|---|
| 3,917,372 | 11/1975 | Selinko | 339/75 M |
| 4,236,667 | 12/1980 | Crowley et al. | 235/443 |
| 4,288,140 | 9/1981 | Griffith et al. | 339/74 R |
| 4,575,703 | 3/1986 | Shishido | 235/479 |
| 4,717,817 | 1/1988 | Grassi et al. | 235/441 |
| 4,724,310 | 2/1988 | Shimamura et al. | 235/483 |
| 4,734,567 | 3/1988 | Hansbauer | 235/482 |
| 4,735,578 | 4/1988 | Reichardt et al. | 439/152 |
| 4,743,746 | 5/1988 | Murschall et al. | 235/441 |
| 4,752,234 | 6/1988 | Reichardt et al. | 439/260 |

(List continued on next page.)

FOREIGN PATENT DOCUMENTS

| | | |
|---|---|---|
| 0 139 593 | 5/1985 | European Pat. Off. . |
| 0 186 737 | 7/1986 | European Pat. Off. . |
| 0 214 478 | 3/1987 | European Pat. Off. . |
| 0 254 316 | 1/1988 | European Pat. Off. . |
| 0 274 534 | 7/1988 | European Pat. Off. . |
| 0 316 699 | 5/1989 | European Pat. Off. . |
| 0 333 530 | 9/1989 | European Pat. Off. . |
| 2 489 558 | 3/1982 | France . |
| 2 607 287 | 5/1988 | France . |
| 2607287 | 5/1988 | France . |
| 2 633 750 | 1/1990 | France . |
| 2952442 A1 | 7/1980 | Germany . |
| 3343727 A1 | 6/1985 | Germany . |
| 3343757 A1 | 6/1985 | Germany . |
| 3402632 A1 | 8/1985 | Germany . |
| 3443561 A1 | 5/1986 | Germany . |
| 3531318 A1 | 3/1987 | Germany . |
| 36 02 668 A1 | 7/1987 | Germany . |
| 3602668 A1 | 7/1987 | Germany . |
| 3625306 A1 | 1/1988 | Germany . |
| 3442397 A1 | 5/1988 | Germany . |
| 38 08 183 | 9/1988 | Germany . |
| 38 10274 | 10/1989 | Germany . |
| 3810275 A1 | 10/1989 | Germany . |
| 3832588 A1 | 3/1990 | Germany . |
| 3931506 A1 | 4/1991 | Germany . |
| 41 39 482 | 6/1993 | Germany . |
| 94 00 349.1 | 7/1994 | Germany | G06K 7/06 |
| 0081286 | 3/1990 | Japan | 235/441 |
| 0081288 | 3/1990 | Japan | 235/441 |

OTHER PUBLICATIONS

English language abstract of PCT Publication No. WO 94/06178, Mar. 17, 1994.
English language abstract of PCT Publication No. WO/27243, Nov. 24, 1994.
Abstract of Japanese Published Pat. Appln. No. 60-022795, *Patent Abstracts of Japan*, Feb. 5, 1985.
Decker Maschineneiemente, 9th Edition, pp. 92-94.
IBM Technical Disclosure Bulletin, vol. 20, No. 5, Oct. 1977, "Actuator Assembly for a Disk File".

*Primary Examiner*—Donald T. Hajec
*Assistant Examiner*—Thien Minh Le
*Attorney, Agent, or Firm*—Bacon & Thomas

[57] ABSTRACT

The invention is directed to a chip card reader with a housing, a guide track built into the housing for receiving a chip card as well as a contact carrier on the side of the housing, the contacts thereof being able to contact corresponding contacts of the chip card in the read position of the chip card in the housing.

9 Claims, 1 Drawing Sheet

U.S. PATENT DOCUMENTS

| | | | |
|---|---|---|---|
| 4,770,639 | 9/1988 | Lau | 439/61 |
| 4,795,897 | 1/1989 | Chalendard | 235/482 |
| 4,799,891 | 1/1989 | Reichardt et al. | 439/43 |
| 4,814,593 | 3/1989 | Reichardt et al. | 235/482 |
| 4,839,509 | 6/1989 | Yasuma et al. | 235/482 |
| 4,874,323 | 10/1989 | Shibano | 439/260 |
| 4,900,273 | 2/1990 | Pernet | 439/630 |
| 4,932,889 | 6/1990 | Bleier et al. | 439/260 |
| 4,975,086 | 12/1990 | Reichardt et al. | 439/629 |
| 4,976,630 | 12/1990 | Schuder et al. | 439/260 |
| 5,012,078 | 4/1991 | Pernet | 235/441 |
| 5,051,566 | 9/1991 | Pernet | 235/475 |
| 5,091,618 | 2/1992 | Takahashi | 235/441 |
| 5,196,680 | 3/1993 | Schuder | 235/449 |
| 5,259,777 | 11/1993 | Schuder et al. | 439/188 |
| 5,269,707 | 12/1993 | Reichardt et al. | 439/630 |
| 5,286,957 | 2/1994 | Defrasne | 235/441 |
| 5,317,138 | 5/1994 | Togawa | 235/440 |
| 5,320,552 | 6/1994 | Reichardt et al. | 439/331 |
| 5,334,034 | 8/1994 | Reichardt et al. | 439/188 |
| 5,334,827 | 8/1994 | Bleier et al. | 439/492 |
| 5,336,877 | 8/1994 | Raab et al. | 235/475 |
| 5,369,259 | 11/1994 | Bleier et al. | 235/441 |
| 5,395,259 | 3/1995 | Casses | 235/475 |
| 5,640,307 | 6/1997 | Bleier et al. | 235/441 |

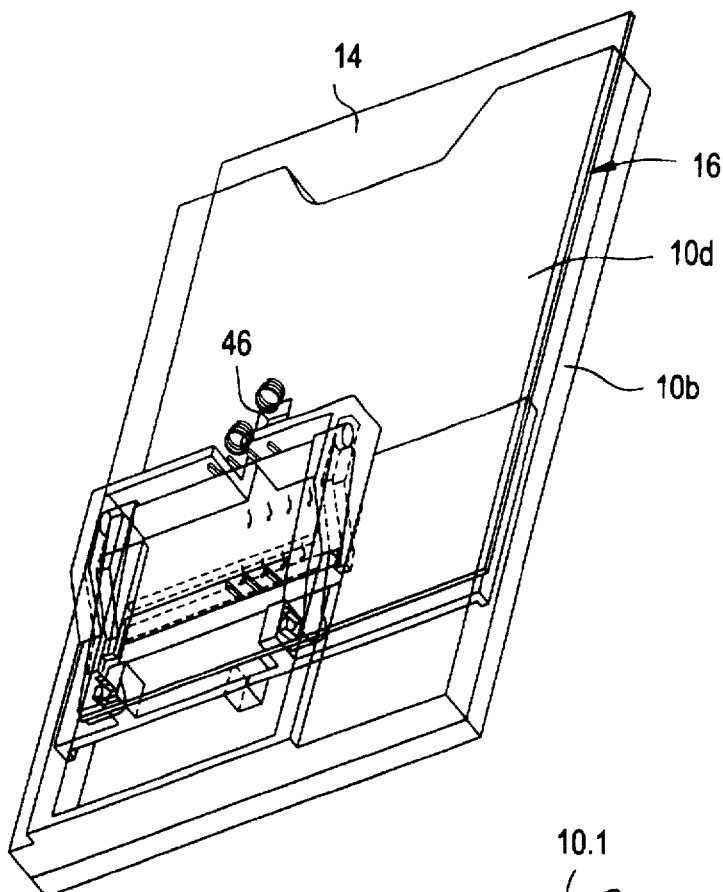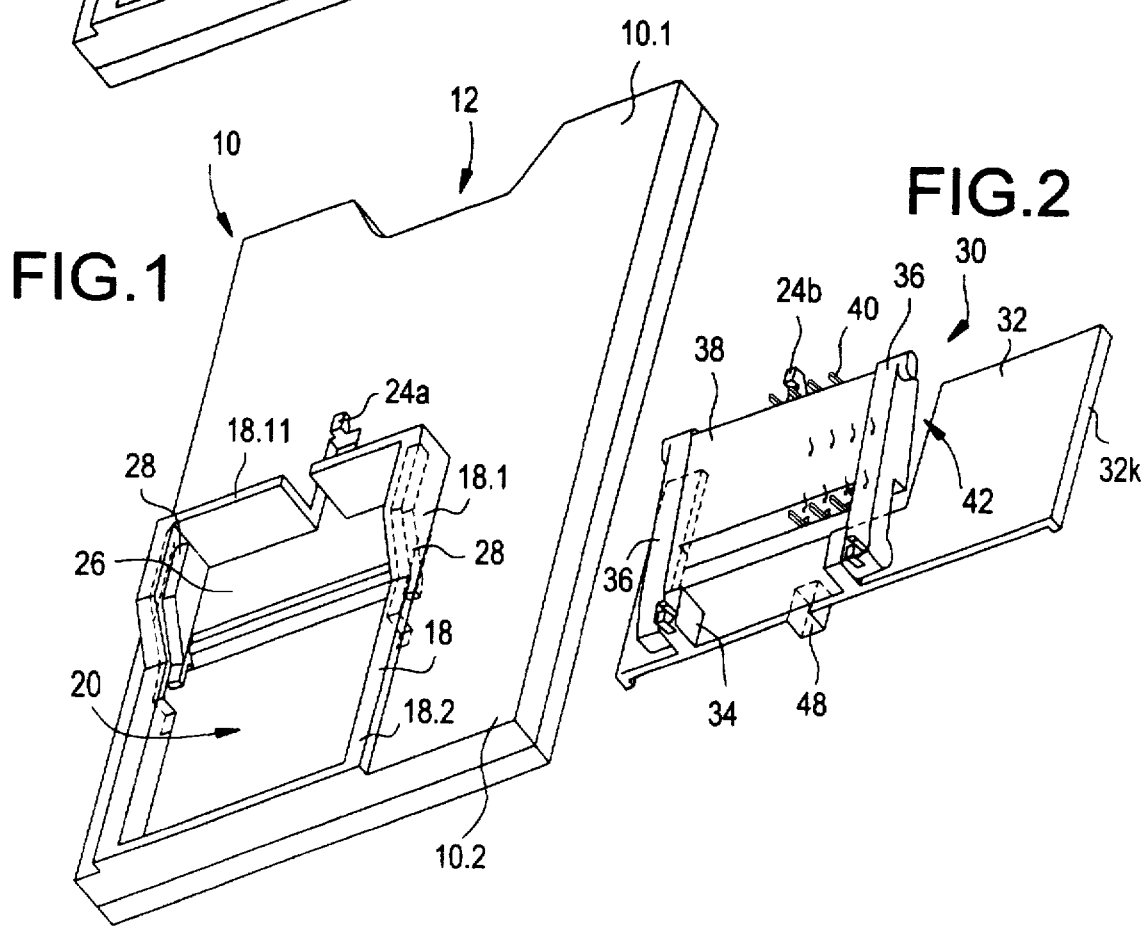

CHIP CARD READER

BACKGROUND OF THE INVENTION

1. Field of the Invention

The invention relates to a chip card reader with a housing, a guide track for receiving a chip card built into the housing, as well as a contact carrier on the sides of the housing with contacts which can come into contact with the corresponding read areas of the chip card when the chip card is inserted into said housing in the reading position.

2. Description of Related Art

Chip card readers have as an object to contact the contacts of the electronic chips arranged on the corresponding card in a determined position (read position) of the card in the reader so that not only a "reading" of the information on the chip, but also an input of information into the chip card is made possible.

Chip card readers of the kind described are applied to various uses, for example, in so-called stationary card-telephones, but also in mobile phones, automatic teller machines and the like.

A chip card reader of this kind is described in DE 38 10 275 Al.

This chip card reader shows a mobile contact carrier in the frame of the reader, which is guided parallel to the insertion of the chip card against the card for making contact.

The electronic connection of the contacts of the chip with the contacts of the contact carrier is obtained through an end position switch which is actuated after reaching the end position of the chip card in the reader (read position) through and rising on the frame (the housing).

The known chip card reader has technically shown good results.

A problem, however, is the rising vandalism by which unauthorized persons try to destroy card readers by, for example, inserting tools into the reader. An especially sensitive area are the contacts of the contact carrier.

This problem is similar in other types of chip card readers.

The object of the invention is, therefore, to provide a chip card reader of the kind known in the art, which has additional safety measures in the case of the mechanical intervention of a unauthorized person.

The invention is based on the recognition that this goal can be solved in a surprisingly simple manner, whereby the contacts in the contact carrier are shielded (protected) in non-use position of the reader by a separating element over the guide track for the chip card.

In other words: the contacts of the contact carriers are protected by said separating element in the non-use position of the reader, in which no card is found in the reader. If in this case, a tool, like a knife, is guided into the guide track of the housing, the contacts of the contact carrier cannot be damaged or destroyed, because the separating element is arranged before the contacts.

It is obvious that the arrangement of contact carrier and separating element then must be removed when the chip card is inserted into the reader in the correct manner.

Insofar, in addition to the mentioned basic concept of the invention, an additional consideration is added, in that the chip card reader is constructed in such manner that the "protection position" of the separating element relative to the contact carrier is cancelled in an appropriate manner when a chip card is inserted in the correct manner, so that, in the reading position of the chip card, the contacts of the chip card and the contact carrier can contact securely with one another.

Accordingly, the complete idea of the invention can be generally formulated in that, during the insertion of the chip card or at least when the end position of the chip card is reached, the separating element and/or the contact carrier are relatively shifted from each other so far that the contacts of the contact carrier are directly opposite to the contacts on the chip card, that is, without a separating element between them. Further it has to be secured, in an additional measure, that the "raised position" of the contact carrier with respect to the chip card which is caused by the separating element, is at least cancelled in the reading position of the chip card and that the contacts of the chip card lie securely against the contacts of the contact carrier.

It is understood that, in this read position, the electronic connection of the corresponding contacts must be "switched free", for example, through the aforementioned end position switch of the state of the art. It is also understood that the card in the read position must be held stationary, for which the state of the art provides several possible solutions, that can be used with the chip card reader of the invention with ease, but that are independent from the features which are placed in the foreground according to the invention and which provide for the mechanical security of the reader.

The invention proposes in all four possible concrete embodiments which, in all, are based on the same basic idea and which can find an alternative or cumulative use.

According to a first embodiment, the contact carrier is structured in such manner that it will move relative to the separating element when the chip card is inserted and the contact carrier or the contacts thereof are movable against the contacts of the chip card.

In this embodiment, the separating element is stationary. In the non-use position of the reader, the contact carrier is "behind" the separating element (relative to the guide track) and only when the chip card is inserted is the contact carrier moved sideways away from the protecting separating element and afterward is guided against the chip card.

According to the second embodiment, the contact carrier is structured in such a manner that it moves away relative to the separating element when the chip is inserted and the chip card or the contacts thereof is movable along the guide track against the contacts of the contact carrier.

The relative movement of the contact carrier and the separating element corresponds herein to the one in the first embodiment. Contrary to the first embodiment, however, the chip card is moved here in the direction of the contact carrier so that the desired contact is ensured. Corresponding guides along the guide track are used to move the chip card against the contact carrier.

The third embodiment is characterized by the following features: the separating element can be moved away relative to the contact carrier when the chip card is inserted into the guide track and the contact carrier or the contacts thereof are guided along the rest of the way of the chip card into the read position against the contacts of the chip card.

Contrary to both of the aforementioned embodiments, the position of the contact carrier relative to the separating element is here "stationary." The separating element is guided away relative to the contact carrier to also set the contacts of the contact carrier free. So as to overcome the "distance" which is caused by the separating element between the contact carrier and the contacts of the chip card, another feature is provided for guiding the contact carrier in the direction of the chip card and against the same when the chip card is inserted further. A movement of the contact carrier mostly in the vertical direction with respect to the chip card follows. "Mostly in the vertical direction" means that the guide track for the contact carrier can also be involute like, since the main purpose is mainly that a secure contact between chip card and contact carrier is obtained.

The fourth embodiment is different from the third embodiment in that the chip card—after detaching of the contact carrier from the separating element—is guided ("lifted") against the contact carrier or the contacts thereof. Otherwise, here is it also valid that the constructive structure is so, that the separating element is moved away relative to the contact carrier during insertion of the chip card into the guide track and the card is therefore "set free."

According to the invention there is provided a chip card reader which provides a secure protection against vandalism with simple means, whereby the other features of the chip card reader, compared with the state of the art, can remain unchanged, for example, the means for holding the card in the read position or for contacting of the contacts by an end position switch.

The person skilled in the art has several embodiments available with reference to the guidance of the contact carrier or separating element. Thereby the technique—known with reference to another field—called "sled technique" may can used. An embodiment of the invention provides that the contact carrier is arranged on a sled which is movable in and against the direction of insertion of the chip card. The sled consists of a sliding plate which is arranged on or in the floor of the guide track and a receiving part for the contact carrier which is attached to the plate in a jointed manner, whereby the receiving part is guided into a downwardly inclined groove (in the direction of insertion of the chip card) and provided at least on one side of the housing.

To ensure a secure insertion of the chip card into the guide track, said plate is advantageously integrated into the floor of the guide track and escapes with the same. In this way, the chip card can be inserted without problems into the guide track and, after reaching an area, described later in detail, it causes the sled to be carried with it and thereby causes the separation of the contract carrier from the separating element parallel thereto, as well as the lowering of the contact carrier along a corresponding "slanted plane" until the final contact position on the contacts of the chip card is reached.

According to another embodiment, the plate can have a collision area on its rearward end (in the feeding direction of the card) for the chip card to ensure that the sled is carried by the chip card. The collision area is built—viewed in the direction of insertion of the card—very narrow in an advantageous manner, so that it can make it difficult or impossible for a unauthorized person to push it away with a tool.

To put the contact carrier or the sled again in its "protection position" after the removal of the card, further measures are necessary to ensure that the contact carrier or sled will be guided back into the non-use position.

This can be carried out by means of corresponding clamp or hook arrangements between the chip card and the contact carrier (sled). In the simplest case, however, the sled is stored under pull tension against the direction of insertion of the chip card, whereby the pull tension, for example, can be provided with the aid of a pull spring and the pull string is with its one end attachable to the contact carrier (sled) and with the other end attachable to the housing.

Additional features of the invention are found in the characteristics of the subclaims as well as the other application documentation. The following figure description belongs also thereto, which also contains general features of the invention.

BRIEF DESCRIPTION OF THE DRAWINGS

The drawings show—all in schematic form

FIG. 1: a housing for a chip card reader.

FIG. 2: a sled with a contact carrier for guidance in the housing according to FIG. 1.

FIG. 3: the housing according to FIG. 1 constructed with the sled according to FIG. 2.

DETAILED DESCRIPTION OF THE PREFERRED EMBODIMENTS

The housing 10 of FIG. 1 shows a basic quadratic shape and is "open" at the one end 10.1. An insertion opening 12 for the chip card 14 is built in, whereby a guide track 16 for a mostly play-free reception of the card 14 is connected to the insertion opening 12 in the direction of the other end 10.2 of the housing 10. Correspondingly, the width of the guide track 16 is equal or slightly larger than the width of the chip card 14 and the height of the guide track 16 is equal or slightly larger than the thickness of the chip card.

In the area of the end 10.2, the housing 10 is open on the top (opening 20) and the frame 18 projects the cover 10d of the housing 10 and is lengthened in the direction of the end 10.1, whereby this frame part 18.1 has a greater height than the frame part 18.2 in the area of the opening 20.

The frame part 18.1.1, which runs perpendicular with respect to the end 10.1, is broken up in the middle and, behind the opening 22, the bearing hook 24a is arranged on the housing cover 10d at a distance. As shown especially in FIG. 1, the frame part 18.1 envelopes a cover part 26 adjacent to the opening 20, which cover part 26 is hereafter called separating element. The separating element is built slanted from the frame wall 18.1.1 toward the opening 20.

In the inner side of the side frame part 18.1 grooves 28 are arranged, as from the opening 20 and specifically according to the construction of the frame parts 18.1 from the opening 20 to the rear wall 18.1.1 first in an upward direction and then in a mostly parallel direction with respect to the surface of the separating element 26.

FIG. 2 shows a sled that carries, in all, the reference sign 30, and which is made of a plate 32 which, as shown in FIG. 3, runs into a corresponding depression on the housing floor 10b and glides securely by angled edges 32k, in the direction of the housing (between the ends 10.1 and 10.2).

Bearing pins 34 extend vertically in the upward direction from the plate 32 in the area of the opening 20, on which arms 36 are attached in a turnable jointed manner and which can receive a contact carrier 38 between them. The contact carrier 38 shows contacts 40 on its bottom side. Said plate 32 is formed below the contact carrier 38 with the corresponding opening 42.

FIG. 3 shows the housing 10 and the sled 30 according to FIGS. 1 and 2 put together. The bearing pins 34 and the arms 36 as well as the contact carrier 38 extend through the opening 20 along the separating element 26, whereby the contact carrier 38 is guided along the side arms 36 into the grooves 28 of the frame 18. A hook 24b in the area of the front forehead surface of the contact carrier 38 serves for receiving a pull spring 46, the other end of which is attached to the hook 24a onto the housing cover 10d. In this manner, the sled 30 is held in the position shown in FIG. 3, whereby a guidance in the guide track 16 results by means of the arms 36 in the grooves 28 and by the angled edges 32k of the plate 32.

As FIG. 1 especially shows, the contacts 40 of the contact carrier 38 are protected by the separating element 26 against the guide track 16 switched between them. If, for example, a tool is used for attacking the guide track, then this cannot lead to a damaging of the contacts 40.

However, if a chip card 14 is correctly inserted into the guide track 16, the following takes place:

The chip card 14 pushes with the front part thereof against a collision area 48 and causes the sled 30 to be moved forward against the force of the pull spring 46 in the direction of the housing end 10.2. Parallel to this movement, the contact carrier 38 is guided along the grooves 28 also in the direction of the housing end 10.2 and thereby moves relative to the separating element 26 and is detached therefrom. Because of the slanted construction of the grooves 28, the contact carrier 38 is lowered in the direction of the chip card 14, and specifically so far, that in the end position (not shown in the drawing) of the chip card 14, the contacts 40 of the contact carrier 38 and the corresponding contacts on the chip card 14 make contact whereby, at the same time, the electronic connection between the opposite lying contacts is achieved by an end position switch (also not shown here).

If the chip card 14 is removed, the sled 30 moves automatically back into the position shown in FIG. 3 and specically, because of the effect of the pull spring 46.

I claim:

1. A chip card reader comprising a housing, a guide track within the housing for receiving a chip card and a contact carrier containing contacts which make contact in the housing with corresponding contacts on said chip card when the chip card is inserted in a read position, wherein the contacts of the contact carrier are protected in a non-use position of said chip card reader by a separating element over the guide track for the chip card, said separating element being arranged between said contacts of the contact carrier and said guide track.

2. The chip card reader according to claim 1, wherein the contact carrier is constructed in such a manner that it will move relative to the separating element when the chip card is inserted into the housing and the contacts of the contact carrier are movable against the contacts of the chip card in the read position.

3. The chip card reader according to claim 1, wherein the contact carrier is constructed in such a manner that it will move relative to the separating element when the chip card is inserted into the housing and the chip card and its contacts, respectively, are moveable against the contact carrier and the contacts thereof as the chip card moves along the guide track into the read position.

4. The chip card reader according to claim 1, wherein the separating element is movable relative to the contact carrier when the chip card is inserted into the housing and the contact carrier and the contacts thereof are moveable into contact with the contacts of the chip card on its way into the read position.

5. The chip card reader according to claim 1, wherein the separating element is movable relative to the contact carrier when the chip card is inserted into the housing and the chip card and its contacts respectively, are moveable into contact with the contacts of the contact carrier on its way into the read position.

6. The chip card reader according to claim 1, wherein the contact carrier is arranged on a sled which is drivable in and against the direction of insertion of the chip card, said sled comprising a plate which is slidable on or in the floor of the guide track and a receiving part for the contact carrier connected in a flexible manner to the plate, whereby the receiving part is guided in at least one groove, provided within said housing and inclined downwardly with respect to the feeding direction of said chip card.

7. The chip card reader according to claim 6, further comprising a buffer for the chip card provided on the rear end of the plate of the sled in the direction of insertion of the chip card.

8. The chip card reader according to claim 6, wherein the sled is held under tension opposite to the direction of insertion of the chip card.

9. The chip card reader according to claim 8, wherein the sled is attached to the housing via a driving spring.

* * * * *